(12) United States Patent
Weiss

(10) Patent No.: US 12,263,658 B2
(45) Date of Patent: Apr. 1, 2025

(54) SYSTEM AND METHOD FOR CLOSING OPENINGS

(71) Applicant: DBT Holdings LLC, Pittsburg, PA (US)

(72) Inventor: Shraga Weiss, Denver, CO (US)

(*) Notice: Subject to any disclaimer, the term of this patent is extended or adjusted under 35 U.S.C. 154(b) by 0 days.

(21) Appl. No.: 18/393,325

(22) Filed: Dec. 21, 2023

(65) Prior Publication Data

US 2024/0123712 A1 Apr. 18, 2024

Related U.S. Application Data

(63) Continuation of application No. 17/163,966, filed on Feb. 1, 2021, now Pat. No. 11,890,838.

(60) Provisional application No. 62/967,699, filed on Jan. 30, 2020.

(51) Int. Cl.

| | |
|---|---|
| *F24F 1/031* | (2019.01) |
| *B32B 3/02* | (2006.01) |
| *B32B 7/06* | (2019.01) |
| *B32B 7/12* | (2006.01) |
| *B32B 27/06* | (2006.01) |
| *F24F 13/20* | (2006.01) |

(52) U.S. Cl.
CPC .............. *B32B 27/065* (2013.01); *B32B 3/02* (2013.01); *B32B 7/06* (2013.01); *B32B 7/12* (2013.01); *F24F 1/031* (2019.02); *F24F 13/20* (2013.01); *B32B 2307/304* (2013.01); *B32B 2509/00* (2013.01); *F24F 2221/20* (2013.01)

(58) Field of Classification Search
CPC .... B32B 3/02; B32B 7/06; B32B 7/12; B32B 27/065; B32B 2307/304; B32B 2509/00; B32B 2509/10; F24F 1/031; F24F 13/20; F24F 2221/20
See application file for complete search history.

(56) References Cited

U.S. PATENT DOCUMENTS 10,429,094 B2 * 10/2019 Mavrommatis ......... F24F 1/027

* cited by examiner

*Primary Examiner* — Jonathan Bradford

(57) ABSTRACT

A system and method to be used to close an opening. In particular, the system may include a kit that seals the opening around a window air conditioning unit which is mounted in a window. The system includes a left side panel which may be placed in a first opening between a side of the air conditioner and a left side jamb of the window. The system further includes a right side panel which may be placed in a second opening between a right side of the air conditioner and a right side jamb of the window. The system also has a top panel which may be placed in the opening between the left side jamb and the right side jamb on the top of the unit. The top panel also includes a first side flap, a second side flap, and a central flap which extend down and over an upper section of the side panels and seal the opening around the unit.

20 Claims, 5 Drawing Sheets

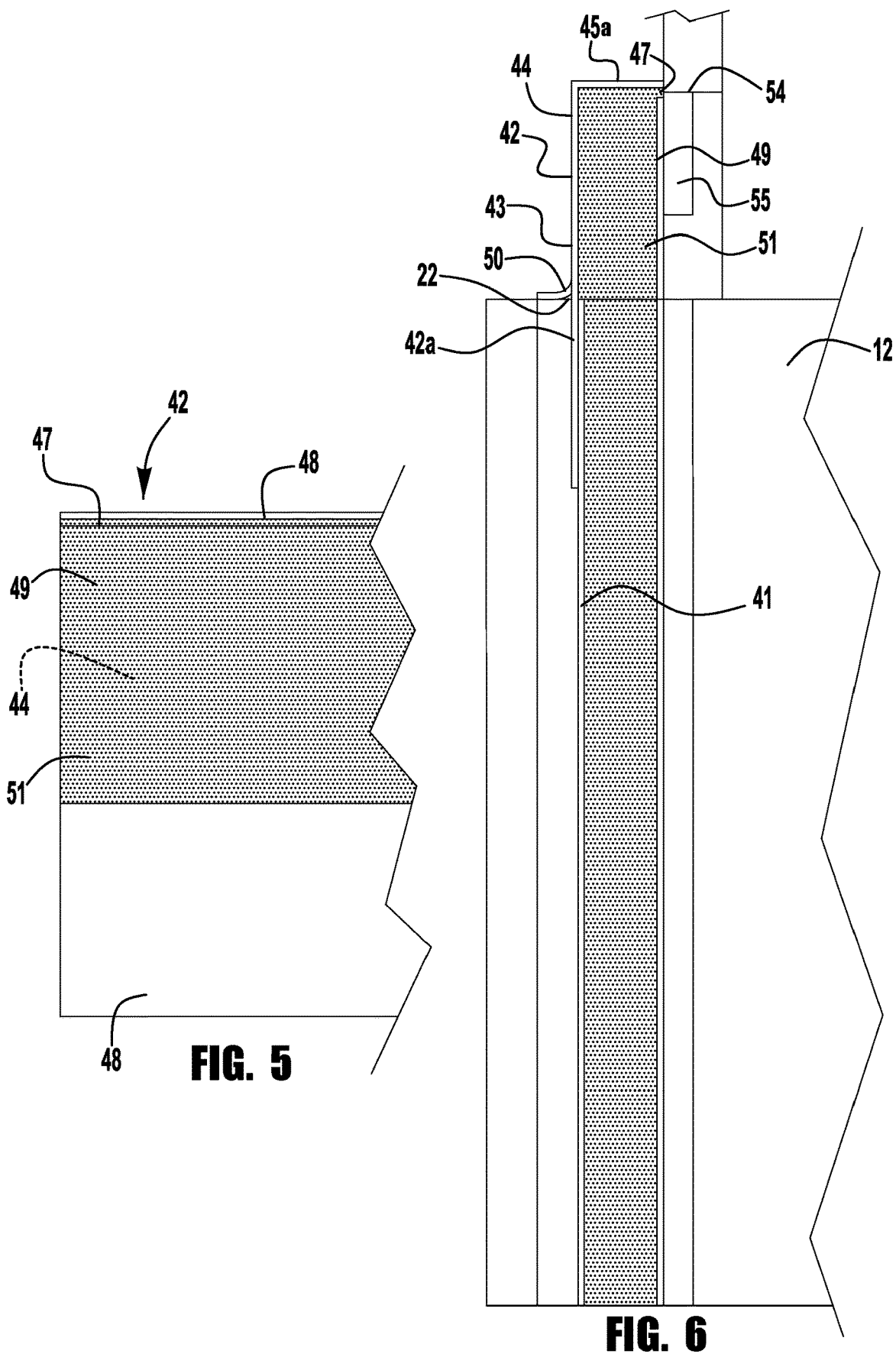

_US 12,263,658 B2_

SYSTEM AND METHOD FOR CLOSING OPENINGS

CROSS-REFERENCE TO RELATED APPLICATION

This application claims the benefit of priority of U.S. Patent Application Ser. No. 17/163,966 filed on Feb. 1, 2021, which in turn claims priority to Provisional Application Ser. No. 62/967,699 filed Jan. 30, 2020.

FIELD OF THE INVENTION

The invention relates to a method and system for closing an opening in a building, and in particular in a windows, including when the opening is created by installing an air conditioner (AC) unit in the window.

BACKGROUND OF THE INVENTION

Window air conditioner units fit within an opening of a window between the left and right jambs of the window, below the lower sash of the window and rest on the sill of the window. The left and right openings vary in dimension as the width of the window AC vary and the width of windows vary. Accordion fillers are available to fill in this variable width opening but lack effective insulation properties. Furthermore, these accordion fillers do not extend over the top of the window AC thereby leaving openings that reduce the effectiveness of the AC.

SUMMARY OF THE INVENTION

According to the present invention, a window air conditioner insulation kit adapted to be used in conjunction with a window air conditioner mounted in a window including a left side panel configured to be pressed in a first opening between a left side of the window air conditioner and a left side jamb of the window when the air conditioner is mounted in the window. A right side panel configured to be pressed in a second opening between a right side of the window air conditioner and a right side jamb of the window. A top panel having an upper primary portion configured to extend and be pressed in a third opening between the left side jamb and the right side jamb when the air conditioner is mounted in the window. The top panel having an upper flap that extends perpendicular and outward from a front surface of the top panel. The top panel having a first side flap, a second side flap and a central flap that are formed integral with the upper primary portion of the top panel and which extend down from the upper primary portion and over an upper section of the first side flap an upper section of the second side flap and onto the top of the AC.

According to another embodiment of the present invention, a window air conditioner insulation kit adapted to be used in conjunction with a window air conditioner mounted in a window, comprises: a left side panel configured to be pressed in a first opening between a left side of the window air conditioner and a left side jamb of the window when the air conditioner is mounted in the window; a right side panel configured to be pressed in a second opening between a right side of the window air conditioner and a right side jamb of the window when the air conditioner is mounted in the window; and both the left side panel and the right side panel having a front surface formed of a flexible sheet of plastic and a rear surface formed of a sheet of compressible rubber foam.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader and should not in any way be interpreted as limiting.

FIG. 5 shows a rear partial view an exemplary top portion having a top flap and a bottom flap adapted to be disposed between the tope surface of the AC and the window.

FIG. 6 shows a side view of an exemplary side portion, left or right, having an insulation panel, a cover coupled to a front face of the insulation panel and a side portion fastener configured proximal to the top of the side portion and configured to detachably attach with the top flap fastener of the top flap.

DETAILED DESCRIPTION OF THE ILLUSTRATED EMBODIMENTS

Figure 1:
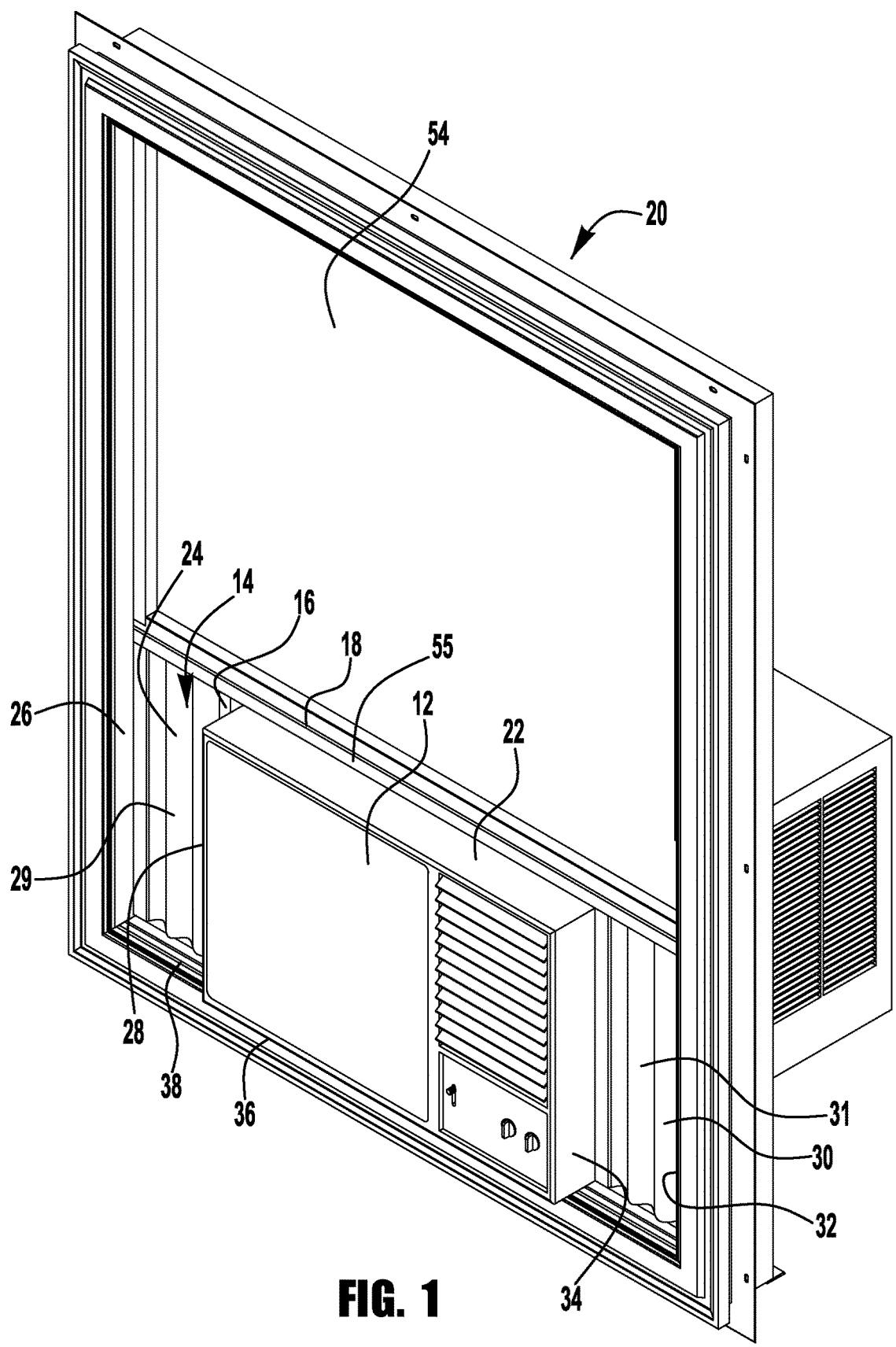
FIG. 1 shows a front perspective view of a window air conditioner (AC) in an opening of a window wherein there is a top opening between the window and the top of the AC, a left side opening between the left side jam and the left side of the AC and a right side opening between the right side jam and the right side of the AC.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 7, there is illustrated an exemplary window AC insulation kit 10 used in conjunction with a window air conditioner (AC) 12. The AC is configured in a window opening 14, wherein there is a top opening 16 between the lower sash 18 of the window 20 and the top 22 of the AC, a left side opening 24 between the left side jamb 26 and the left side 28 of the AC and a right side opening 30 between the right side jamb 32 and the right side 34 of the AC.

Typically, the left side opening 24 between the left side jamb 26 and the left side 28 of the AC is filled an accordion side panel 29 that can be adjusted to fill the opening 24. Similarly, the right side opening 30 between the right side jamb 32 and the right side 34 of the AC is filled an accordion side panel 31 that can be adjusted to fill the opening 30.

The bottom 36 of the AC 12 is resting on and supported by the sill 38 of the window 20.

While the openings 24 and 30 between the window AC 12 and the window opening 14 are closed by accordion side panels 29 and 31, the accordion side panels are prone to leak air between the front and rear sides of the AC and thereby reduce the efficiency of the cooling. The result is that the cost of cooling the room that is being cooled by AC is increased.

The window AC insulation kit 10 of the present invention overcomes this problem by providing sufficient sealing and insulating between the top 22, the left side 28, the right side 34 and an installation bar holds the AC in the window and that extends across the width of the window. The installation bar is located below the window 20. In addition, the window AC insulation kit 10 provides an attractive cover between the top 22, the left side 28, and the right side 34 of the window AC and just below the window 20. An important aspect of the present invention is that the window AC insulation kit 10 can be installed on an AC that is already mounted in a window without the need to remove any of the mounting portions already in place.

The window AC insulation kit 10 includes a left panel 40 configured to be pressed between the left side 28 of the window AC 12 and the left side jamb 26 of the window 20. Further, the window AC insulation kit 10 includes a right panel 41 configured to be pressed between the right side 34 of the window AC 12 and the right side jamb 32 of the window 20. Moreover, a top panel 42 is installed to cover the installation bar and extend over the top 22 of the AC.

Figure 2:
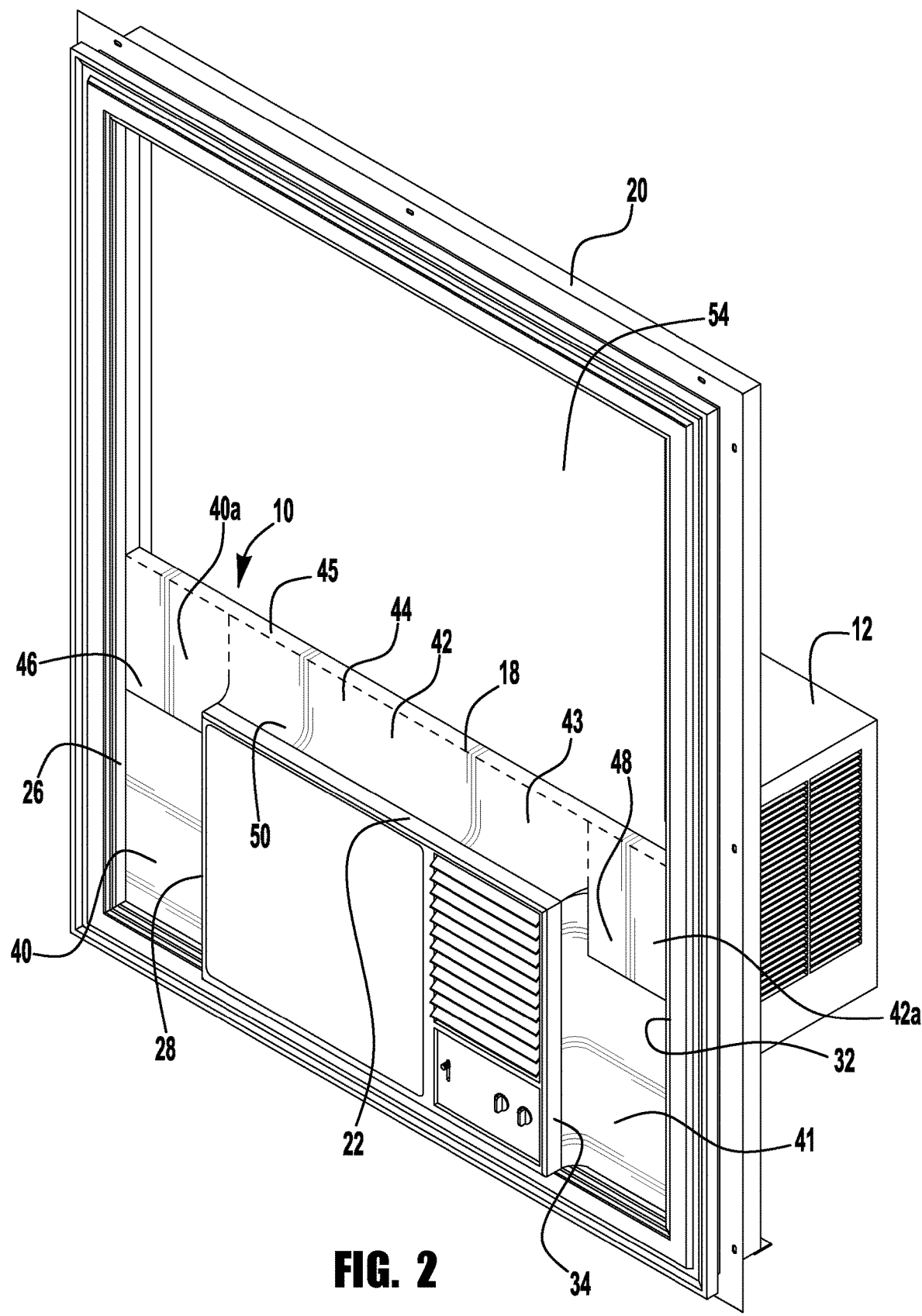
FIG. 2 shows a front perspective view of an AC configured in a window and an exemplary window AC insulation kit configured around the AC unit to close and insulate the openings between the AC and the window.

As illustrated in FIG. 2, the top panel 42 has an upper primary portion 44 which extends between the left side jamb 26 and the right side jamb 32. The top panel 42 has an upper flap 45 that extends perpendicular and outward from the front surface 43 of the top panel 42 and when the top panel is installed, curls over the installation bar 55 disposed below the lower sash 18.

The top panel 42 has a first side flap 46, a second side flap 48 and a central flap 50 that are formed integral with upper primary portion 44 and extend down from the upper primary portion 44 towards the sill 38 of the window 20.

The first side flap 46, the second side flap 48 and the central flap 50 are configured to couple with the upper portions 40a and 42a of the side panels 40 and 41, respectively, and to the top surface 22 of the AC. The side flaps 46 and 48 and central flap 50 can include a stripe of adhesive on the back side thereof to form a fastener configured along the back side of the three top flaps 46, 48 and 50. Each stripe of fastener can be covered with a removably strip of material, such as for example, a strip of paper.

Figure 4:
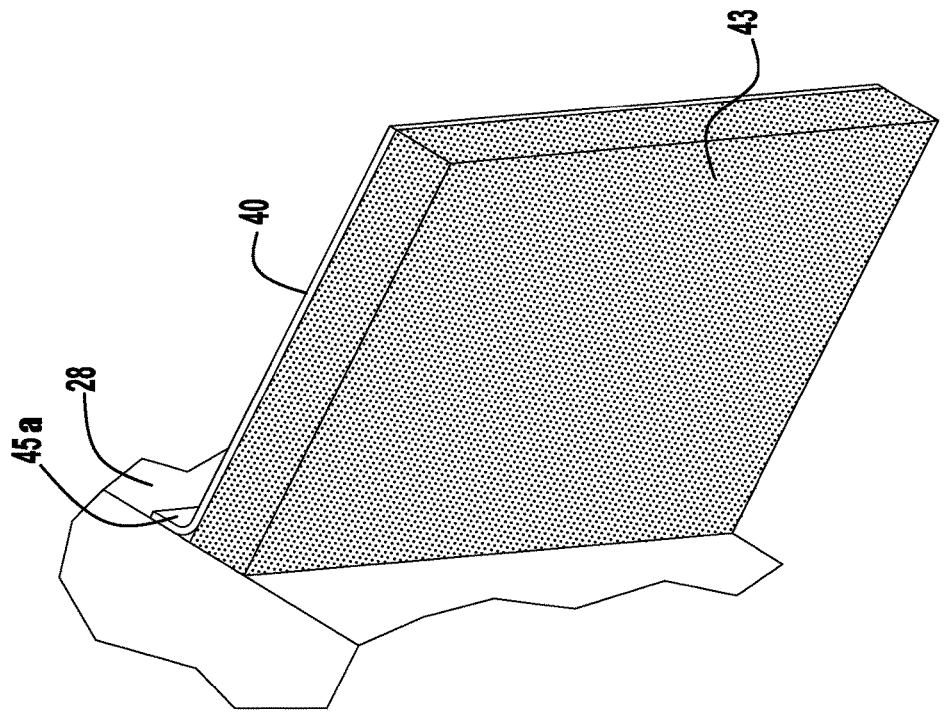
FIG. 4 shows a perspective view of one of the side insulation panels installed between and a window AC and the window with the flap against the AC to close and insulate the opening between the AC and the window.
Figure 3:
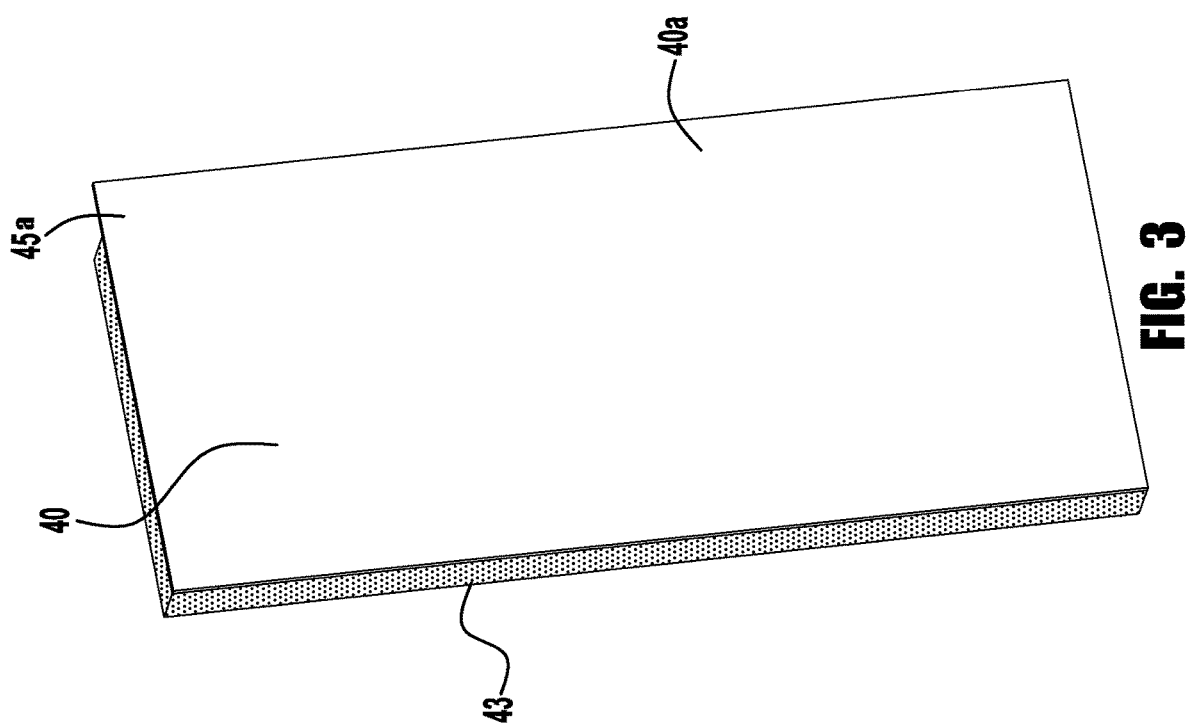
FIG. 3 shows a perspective view of a side insulation panel having a flap provided to be inserted between an exemplary window AC and an opening in a window.

As shown in FIGS. 3 and 4 an exemplary left side panel 40 has a front surface 40a formed of a flexible sheet of plastic, such as vinyl. The rear surface 43 of the exemplary left side panel 40 is formed of a sheet of compressible rubber foam. The sheet of rubber foam is adhered to the flexible sheet of plastic by any desired conventional means such as glue. The flexible sheet 40a of plastic extends past the sheet of compressible rubber foam to form a flap 45a that is bent away from the rubber foam when the panel 40 is installed. The surface of the flap 45a that is bent away from the rubber foam 43 includes a stripe of adhesive. The left panel 40 is configured so that the flap 45 is pressed between the left side 28 of the window AC 12 and the left side jamb 26 of the window 20. As shown in FIG. 4, the adhesive strip on the surface of the flap 45a is secured to the left side 28 of the window AC 12.

Note that the right side panel may have all the same features as the left side panel.

Referring to FIG. 5, there is shown a rear view of a section of the top panel 42 where the second side flap 48 as shown in FIG. 2 are formed integral with upper primary portion 44. An edge 47 of foam rubber projects outward from the rear surface 49 of the sheet of compressible foam rubber 51 and covers the installation bar 55 below the window 54, as shown in FIG. 6, when the top panel 42 is in place and secured by the side flaps 46 and 48 and central flap 50 to the side panels 40 and 42, respectively, and to the top 22 of the AC.

Referring to FIG. 6, there is illustrated a side view of the right side panel installed. The top panel 42 is mounted below the glass panel 54 of the window 20 so that the upper primary portion 44 extends between the left side jamb 26 and the right side jamb 32. The top panel 42 has an upper flap 45 that extends perpendicular and outward from the front surface 43 of the top panel 42 and curls over the foam rubber 51 and covers the installation bar 55.

The top panel 42 can include a stripe of adhesive on the back side thereof to form a fastener configured along the back side of the three top flaps 46, 48 and 50, as seen in FIG. 2. Each stripe of fastener can be covered with a removably strip of material, such as for example, a strip of paper. When installed, the flap 42a overlies the side panel 41 and can be secured thereto by the adhesive.

Further, central flap 50 can be secured by the stripe of adhesive to the top 22 of the AC.

Figure 7:
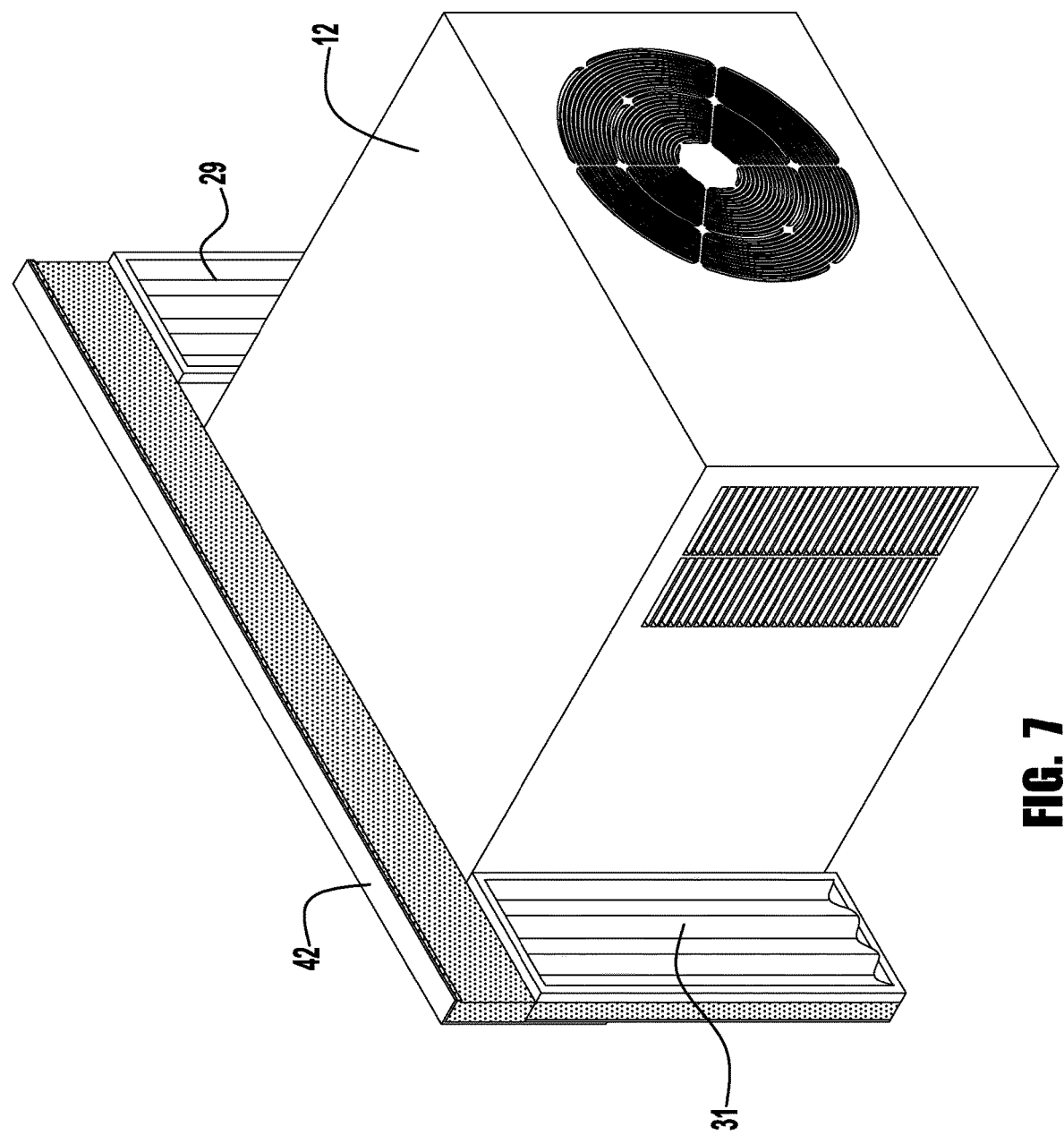
FIG. 7 shows a perspective rear view of a window AC insulation kit having side insulation panels and a top insulation panel mounted between the window and the AC.

As shown in FIG. 7, an exemplary top portion 42 extends between the left side jamb 26 and the right side jamb 32. Note that when the window AC insulation kit 10 is installed, the accordion side panels 29 and 31 remain in place.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A system for closing an opening adjacent a window air conditioner mounted in a window, comprising:

a left side panel configured to be placed in a first side of an opening;

a right side panel configured to be placed in a second side of said opening;

a top panel having an upper primary portion configured to be placed in a third side of said opening;

the top panel having a first side flap, a second side flap, and a central flap that are formed integral with the upper primary portion of the top panel;

wherein the first side flap extends over an upper section of the left side panel, the second side flap extends over an upper section of the right side panel, and the central flap extends down from the upper primary portion to close a portion of the third side of said opening;

wherein the left side panel includes a left panel front surface and a left panel back surface, the right side panel includes a right panel front surface and a right panel back surface, and the top panel includes a top panel front surface and a top panel back surface; and wherein at least some of said surfaces seal against a mounting surface.

2. The system according to claim 1 wherein first side flap, the second side flap, and the central flap are contiguous.

3. The system according to claim 1 wherein at least one of said left panel back surface, right panel back surface, or top panel back surface includes a detachable fastener.

4. The system according to claim 3 wherein said detachable fastener includes a strip of glue.

5. The system according to claim 3 wherein the detachable fastener is an adhesive strip removably covered with at least one strip of material.

6. The system according to claim 1 wherein at least one of said left panel front surface, right panel front surface, or top panel front surface includes a plastic layer.

7. The system according to claim 1 wherein at least one of said left side panel, right side panel, or top panel includes a multilayer construction.

8. The system according to claim 7 wherein said multilayer construction includes a layer of foamed material and a layer of plastic.

9. A method of sealing an opening in a window around a window air conditioner unit, comprising:

providing a left side panel, having a left panel front surface and left panel back surface, configured to be placed into a first side of the opening;

providing a right side panel, having a right panel front surface and a right panel back surface, configured to be placed into a second side of said opening;

providing a top panel, with a top panel front surface and top panel back surface, and having an upper primary portion configured to be placed into a third side of said opening;

wherein the top panel includes a first side flap, a second side flap, and a central flap that are formed integral with the upper primary portion of the top panel;

mounting the left side panel and the right side panel in the opening;

mounting the top panel such that said first side flap extends over an upper portion of the left side panel and the second side flap extends over an upper portion of the right side panel.

10. The system according to claim 1 wherein the top panel includes an edge which projects outwardly from the rear surface of the top panel and seals against a mounting surface.

11. The system according to claim 10 wherein the edge is flexible.

12. The method according to claim 9 further comprising the steps of forming slits in the top panel to create the first side panel and the second side panel.

13. The method according to claim 12 wherein at least one of said left panel back surface, right panel back surface, or top panel back surface includes a detachable fastener.

14. The method according to claim 13 wherein said detachable fastener includes a strip of glue.

15. The method according to claim 13 wherein the detachable fastener is an adhesive strip removably covered with at least one strip of material.

16. The method according to claim 9 wherein at least one of said left panel front surface, right panel front surface, or top panel front surface includes a plastic layer.

17. The method according to claim 9 wherein at least one of said left side panel, right side panel, or top panel includes a multilayer construction.

18. The method according to claim 17 wherein said multilayer construction includes a layer of foamed material and a layer of plastic.

19. The method according to claim 9 wherein the top panel includes an edge which projects outwardly from the rear surface of the top panel and seals against a mounting surface.

20. A method of sealing an opening in a window around an air conditioning unit comprising:

providing a left side panel, having a left panel front surface and left panel back surface, configured to be affixed in a first side of the opening;

providing a right side panel, having a right panel front surface and a right panel back surface, configured to be affixed in a second side of said opening;

providing a top panel, with a top panel front surface and top panel back surface, and having an upper primary portion configured to extend from the right side panel to the left side panel;

wherein the top panel includes adhesive on said top panel back surface;

mounting the top panel such that it covers the first side panel with a first side flap and covers the second side panel with a second side flap; and wherein said first side panel, second side panel, and top panel seal the opening around said air conditioning unit.

* * * * *